Dec. 5, 1950 O. TSCHUMI 2,532,582
SYNCHRONIZING DEVICE FOR STEPPING MECHANISMS
Filed Dec. 30, 1947 3 Sheets-Sheet 1

Inventor
Otto Tschumi
By Robert E. Burns
Attorney

Dec. 5, 1950     O. TSCHUMI     2,532,582
SYNCHRONIZING DEVICE FOR STEPPING MECHANISMS
Filed Dec. 30, 1947     3 Sheets-Sheet 2

Inventor
Otto Tschumi
By Robert E. Burns
Attorney

Dec. 5, 1950 O. TSCHUMI 2,532,582
SYNCHRONIZING DEVICE FOR STEPPING MECHANISMS
Filed Dec. 30, 1947 3 Sheets-Sheet 3

INVENTOR
OTTO TSCHUMI
BY
ATTORNEY

Patented Dec. 5, 1950

2,532,582

UNITED STATES PATENT OFFICE 2,532,582

SYNCHRONIZING DEVICE FOR STEPPING MECHANISMS

Otto Tschumi, Soleure, Switzerland, assignor to Autophon Aktiengesellschaft, Soleure, Switzerland Application December 30, 1947, Serial No. 794,576
In Switzerland February 26, 1943

Section 1, Public Law 690, August 8, 1946
Patent expires February 26, 1963

3 Claims. (Cl. 177—353)

In the Swiss Patent Specification No. 200,495 description is given of a synchronizing device for stepping mechanisms for the optical indication of single- and multi-digit numbers or signs with rectifiers $Gz$, $Ge$ and contacts $z$, $e$. The cost of such device with a rectifier and a contact for each switching mechanism is considerable. As compared with previous executional forms, the advantages are the small number of lines and the simplified switching operation, as before or after setting no zeroising or other synchronizing position is necessary. The stepping mechanism moves directly from the position occupied previously into the new position corresponding to the new setting.

A further synchronizing device for instruments with optical or direct indication of single- and multi-digit numbers is described in the Swiss Patent Specification No. 231,806. Instead of a rectifier and a contact, a mechanical device is provided. If several stepping units are being operated from a common arresting and unlocking relay R (Figs. 3 and 4, Swiss Patent Specification No. 231,8806), it is necessary, without using a very complicated circuit in the exchange, to bring such stepping mechanisms back into a neutral position, after setting. It would also be possible to use several units according to Fig. 1 (Swiss Patent Specification No. 231,806) which each consist of a stepping mechanism with the corresponding arresting and unlocking relay. In such an arrangement the zeroising could be avoided although the quantity of lines required would be according to the number of units, considerable.

The object of the present invention is to eliminate the described disadvantages and to keep at the same time the advantages. This is being obtained according to the invention in that with each stepping mechanism is associated a locking magnet with a condenser in series with this magnet, both the locking magnet and the stepping mechanism being connected to the same lines and operated by different kinds of current.

It is assumed in the present example that synchronizing takes place every time the numbered disc $Pz$, $Pe$, passes through the zero position. In principle, such synchronizing may take place with the discs $Pz$, $Pe$, in any position.

Figure 1:
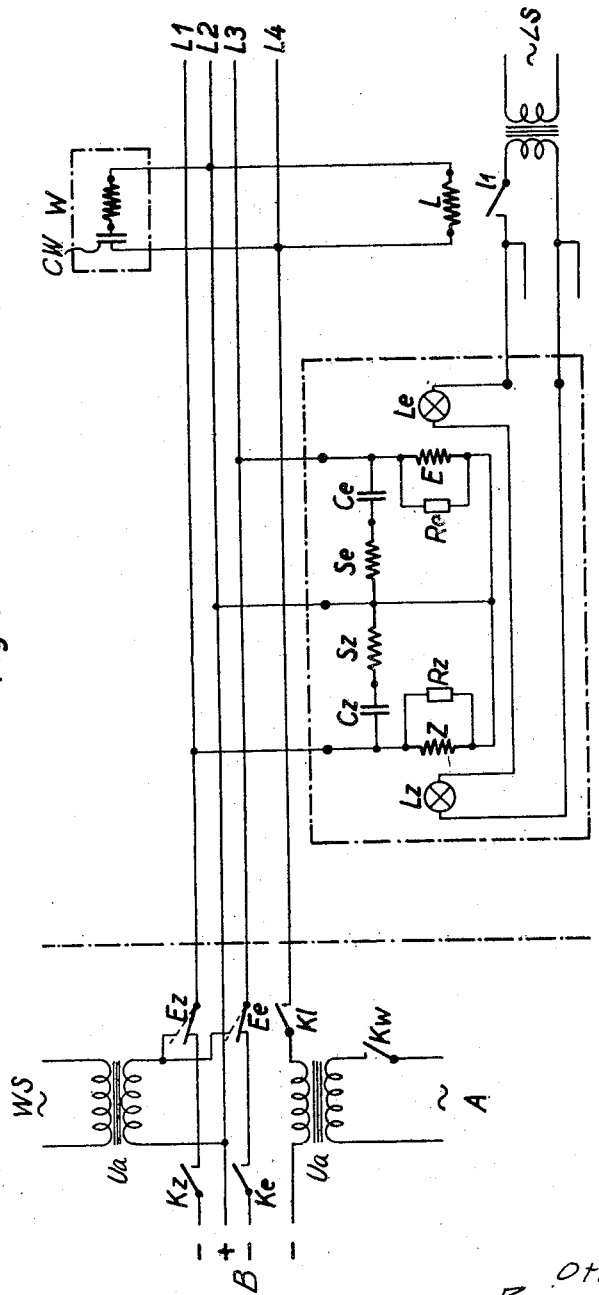
Fig. 1 is a schematic view showing an example of the synchronizing device according to the present invention, for an instrument used in connection with the indication of a two-digit number.

In Fig. 1 the control means for the control of the different stepping mechanisms are separated by a chain-dotted line from the stepping mechanisms and from those parts which, relating to space, form a unit. The control means consists substantially of a battery B, the negative terminal of which is connected with the ends of the lines $L_1$, $L_3$ and $L_4$, the positive pole of the battery B being connected to the line $L_2$. $L_1$ and $L_3$ designate two transmitting wires, $L_2$, a common return wire and $L_4$ a wire for transmitting or releasing a warning signal of a buzzer, for example. Besides the above-mentioned battery B, the central comprises two alternating-current sources WS and A, as well as the contacts $Ke$, $Kz$, $Ee$ and $Ez$, the two latter being closed at rest position and the two former opened. The contacts $Kz$ and $Ez$ lie in the transmitting wire $L_1$, the contacts $Ke$ and $Ee$ in the transmitting wire $L_3$. In the dotted position of the contacts $Ee$ and $Ez$, the alternating-current source WS may be connected to the corresponding transmitting wires $L_1$ and $L_3$, in which case the alternating-current circuit is closed through the common return wire $L_2$ and back to the alternating-current source WS. The alternating-current A is connected with the alarm wire $L_4$ through the contact $Kw$ and the transformer $Ua$. The alarm wire $L_4$ may be closed by operation of the contact $Kl$ whereby both an alternating-current and a direct current circuit is closed through the alarm wire $L_4$, the buzzer W and the relay winding L respectively, the common return wire $L_2$ and the battery B.

The electrical part of the two stepping mechanisms, namely of the stepping mechanism ESW for single-digit numbers and of the switching mechanism ZSW for two-digit numbers consists of the coils E and Z respectively, of the stepping relay ER and ZR respectively, which are bridged by a resistance $Re$ and $Rz$ respectively, and connected with the transmitting wire $L_3$ and $L_1$ respectively, on the one hand, and with the common return wire $L_2$ on the other hand. While short-circuiting the said coils, a condenser $Ce$ or $Cz$ respectively and the coil $Se$ or $Sz$ respectively of a locking magnet $S_eR$ or $S_zR$ respectively are arranged in each of the stepping mechanisms between the transmitting wire $L_3$ or $L_1$ respectively and the common return wire $L_2$. In this way, two parallel branches are formed between the transmitting wire $L_3$ or $L_1$ respectively and the common return wire $L_2$, namely a first branch consisting of the coil E or Z respectively of the corresponding stepping relays ER and ZR, and of a second branch formed of the condenser $C_e$ and the coil $S_e$ or $S_z$ respectively of a locking magnet $S_eR$ or $S_zR$ respectively. Two light sources $L_e$ and $L_z$ for illuminating the number belong to the two stipping mechanisms, these light sources being connected in series and being fed by the alternating-current sources LS through a contact I belonging to a relay whose coil is designated by L. Further means provided are: the above mentioned relay winding L connected to the alarm wire $L_4$ and to the common return wire $L_2$, as well as a buzzer W, whose electrical part substantially consists of a condenser CW and of a coil SW, these two means being connected in series and connected with the alarm wire $L_4$ on the one side and with the common return wire $L_2$ on the other side.

The synchronizing device according to the present invention substantially consists of an inner casing portion G, to which is fitted a cover $D_1$ on the one side and cover $D_2$ on the other side. The cover $D_1$ encloses a space in which a light source $L_e$ is held in a manner not shown, while the bottom of the cover $D_2$ consists of a ground glass Ms. To the inner casing portion a triangular plate Pl is screwed by means of the supporting screw $L_1$, a pierced setting Fg being held on the plate Pl. The window Fs of the setting Fg allows the rays emitted by the light source Le to fall upon the numbered disc Pe and to project the perforations of the latter which are formed as digits through the optical means Op to the ground glass Ms. The screw bolts Bs traverse the plate Pl and are fixed to the base plate Gp immovably fixing in this way the mutual position of the inner casing portion G, the plate Pl and the base plate Gp. A shaft We is mounted on the base plate Gp and held in a bearing piece Lt on its end turned towards the plate Pl, while carrying the numbered disc Pe on its free end. This numbered disc Pe consists of a thin sheet having as many lips Lp as there are digits and on which the digits Zf are cut out. Between the bearing piece Lt and the base plate Gp a helically toothed wheel Zr is fixed to the shaft We. This wheel has as many teeth as there are lips Lp and digits Zf. On the end opposite to the numbered disc Pe the shaft We carries a cam Ne being of such length (see Fig. 2) that the armature Ae of the locking magnet SeR may enter into its path and thereby lock the shaft We. The base plate comprises a hole in which the setting Fa for the optical means Op is set. Furthermore, all the electrical parts are fixed to the base plate, namely: the switching relay ER, the locking magnet SeR, the resistance Re and the condenser Ce. The armature of the stepping relay ER is fixed to the shaft EW so that the shaft is oscillated to and fro as the armature Ae of the stepping relay ER is either attracted or released. The shaft EW which is mounted on the two limbs of the U-shaped yoke Je and on the base plate Gp, carries on its free end an actuator comprising two levers Sh. These levers are so dimensioned and lie at such an angle with regard to each other that one of the pins Za fixed to their ends lies above a tooth profile when the other engages a tooth gap. From this it follows that on oscillation to and fro of the levers Sh with the shaft EW in accordance of the movements of the armature Ae, the toothed wheel Zr is rotated on each motion by half a tooth pitch. Since, as mentioned above, the number of the teeth corresponds to the number of digits Zf on the numbered disc Pe, it follows that, always after one motion to and fro of the levers Sh, i. e., when the stepping relay ER is excited and again released, which corresponds to two motions, namely to an advance and return stroke of the levers Sh, the toothed wheel Zr is rotated by two half pitches, i. e., by one complete tooth pitch, while the numbered disc is rotated by the angular distance of two adjacent digits. Considering the fact that the mutual position of the numbered disc Pe and the toothed wheel Zr is such that a digit Zf of the numbered disc Pe is in front of the window Fs if the pin of the left-hand lever Sh engages a tooth gap, for example, it follows that, on rotation of the shaft EW in one direction, the numbered disc Pe is turned by half a pitch while on the following rotation in the opposite direction, the next digit Zf of the numbered disc Pe comes in front of the window Fs. The two levers Sh are under the influence of a spring Fd, the tension of which may be adjusted by means of the wheel Sr.

Figure 3:
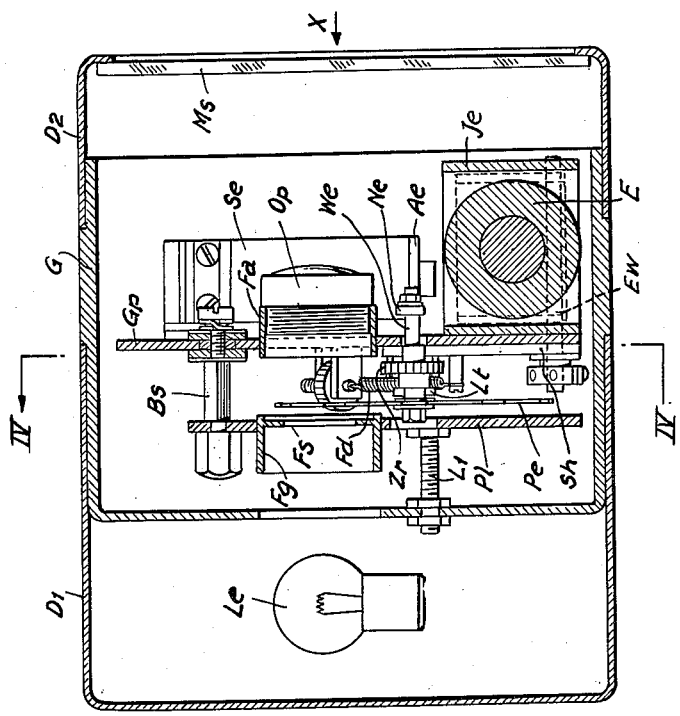
Fig. 3 is a section through the switching mechanism for single digit numbers, along the lines III—III of Fig. 2.
Figure 4:
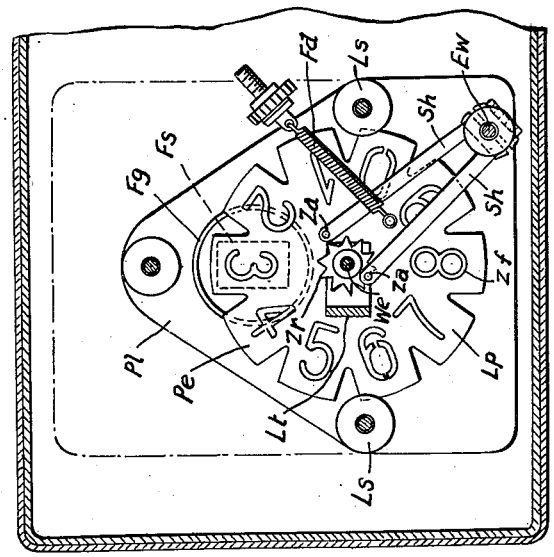
Fig. 4 is another section through the same switching mechanism, taken along the line IV—IV of Fig. 3.

The construction of the stepping mechanism ZSW for two-digit numbers corresponds exactly to that of the stepping mechanism for one digit numbers, as shown in Figs. 3 and 4, wherein the stepping relay is designated by ZR, the shaft by Wz, the cam by Nz, the locking magnet by SzR and its armature by Az, the numbered disc Pz, the condenser by Cz, the resistance by Rz and the light source by Lz.

The manner of operation is as follows. Starting from the position wherein the stepping mechanism for single-digit numbers digit 8, and in the stepping mechanism for two-digit numbers digit 1 is in the front of the window Fa and that number 26 is now to be adjusted, the numbered disc Pe of the mechanism for single-digit numbers must be turned until digit 6, and the disc Pz of the two-digit mechanism must be rotated until digit 2 lies in front of the windows Fs of the corresponding stepping mechanisms. Furthermore, as already mentioned, it may be presumed that synchronizing takes place in the zero position. However, synchronizing might as well take place in any other position desired.

Rotation of the numbered discs of the two stepping mechanisms by the necessary angles is obtained in the following manner:

The contact Kz is operated once, corresponding to the number of steps to be made by the numbered disc of the two-digit mechanism. By this direct current impulse through the negative pole of the battery B, the contact Kz, the closed contact Ez, the coil z of the stepping relay ZR, and backwards through the wire L2 to the positive pole of the battery, the armature Az of the relay ZR is attracted and released again, whereby the shaft We is once rotated to and fro. As a consequence, the levers Sh likewise move to and fro and rotate the toothed wheel Zr by one pitch, thereby bringing the following digit 2, in front of the windows Fs.

Figure 2:
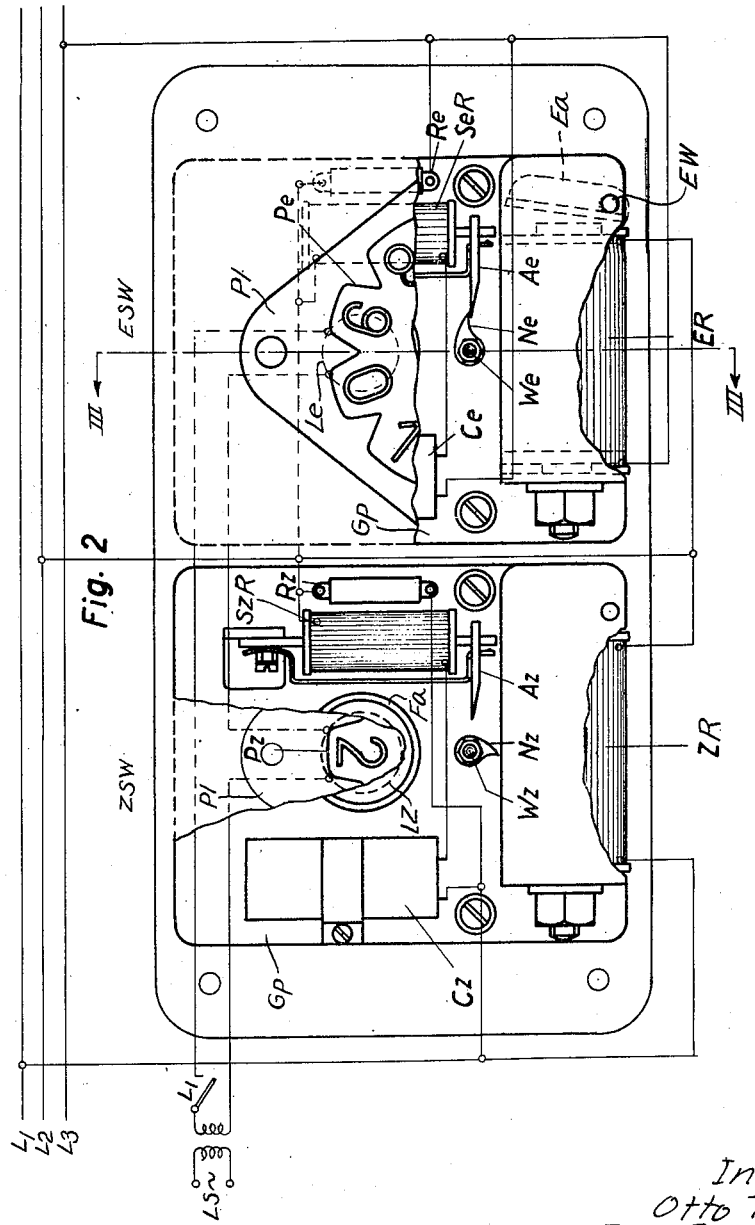
Fig. 2 illustrates a top view of a switching mechanism for single-digit numbers, and one for two-digit numbers, taken in the direction of the arrow X in Fig. 3, the upper part of the base plate being broken away in order to make the numbered discs partly visible.

For operating the one-digit mechanism ESW light impulses should in reality be given to the wire L3, eight such impulses being obtainable by eight closings of the contact Ke. However, to permit synchronizing in the zero position, i. e., to assure that at the synchronizing point the numbered discs (Pe in this instance) are in correct position and that no displacements have taken place, as many impulses are given as are necessary for reaching the synchronizing point, i. e., in the present case two impulses, since it is presumed that synchronizing takes place in the zero position. For this reason, the position of the cam Ne with regard to the numbered disc Pe is chosen in such manner that after the last half pitch before the zero position, i. e., the position of the numbered disc in which the digit 0 lies in front of the windows Fs, it is locked by the armature of the locking magnet Se, as shown in Fig. 2. After these two impulses, at which time the locking position should normally have been reached, any desired number of further impulses are given by momentary closing of the contact Ke, so that the zero or locking position respectively will in any case be obtained without regard as to whether certain displacements would have occurred or not. Thereafter the contact Ee is closed, and in this manner an alternating-current circuit is formed through the alternating-current source Ws, contact Ee, condenser Ce, locking magnet Se, and backwards through the wire L2 to the alternating current source Ws. Since the coils E and Z of the switching relays ER and ZR are not responsive to alternating current, only the locking magnet is momentarily energized, whereby the locking between the armature of the locking magnet, Ae, and the locking cam, Ne, is removed. The locking prior to the last half pitch having taken place before reaching the zero position, the last half pitch is carried out under the influence of the spring Fd, so that the cam is rotated out of reach of the locking armature Ae immediately, i. e., as long as the alternating-current impulse lasts. Thereafter the six remaining impulses are given, and the digit 6 lies in front of the window Fs.

The operation in the two-digit mechanism is quite the same when the numbered disc Pz of the two-digit mechanism has to pass the synchronizing position, which, naturally, in the case of the one-digit operation explained above, was not necessary.

What I claim is:

1. In an installation for the optical indication of indicia, the combination of a rotatable shaft, a disc carrying said indicia and a toothed wheel fixed on the shaft, an oscillatable actuator carrying spaced fingers engageable with the teeth of said wheel, a direct current electromagnet for moving said actuator in one direction to move said wheel one half pitch by engagement of one of said fingers with a tooth of the wheel, a spring for moving the actuator in the opposite direction to move said wheel a second half pitch by engagement of the other finger with a tooth of the wheel, a locking cam fixed on said shaft, a locking magnet comprising an armature normally in the path of said cam in a position to block said cam and thereby lock the shaft prior to the last half pitch before reaching a predetermined zero position, and an alternating current coil for retracting said armature out of the path of said cam, an electric light for illuminating said indicia, a source of electric current for the light, a relay for connecting the light to said source of current, an audible alarm including a coil and condenser and a contact circuit comprising a pair of conductors, the electromagnet for moving the actuator and the coil of the locking magnet being connected in parallel with one another across said pair of conductors, a condenser in series with the locking magnet coil, a third conductor, the light relay and the audible alarm being connected in parallel with one another between the third conductor and one conductor of said pair, with the condenser and coil of the audible alarm in series with one another, sources of direct current and of alternating current, switching means for intermittently connecting said pair of conductors to a direct current source to energize the electromagnet for moving the actuator to turn the toothed wheel, shaft and disc until blocked by the engagement of said cam with the armature of the locking magnet in a position one half pitch before said zero position, switching means for connecting said pair of conductors to an alternating current source to energize the locking magnet and thereby unlock said shaft, switching means for connecting said third conductor and one conductor of said pair to a direct current source to energize the relay controlling the light and means for connecting the third conductor and one conductor of said pair to an alternating current source to actuate said alarm.

2. In an installation for the optical indication of indicia, a rotatable shaft, a disc carrying said indicia and a toothed wheel fixed on said shaft, an oscillatable actuator carrying spaced fingers engageable with the teeth of said wheel, a direct current electromagnet for moving said actuator in one direction to move said wheel one half pitch by engagement of one of said fingers with a tooth of the wheel, a spring for moving the actuator in the opposite direction to move the said wheel a second half pitch by engagement of the other finger with a tooth of the wheel, a locking cam fixed on said shaft, a locking magnet comprising an armature normally in the path of said cam in a position to block said cam and thereby lock the shaft prior to the last half pitch before reaching a predetermined zero position and an alternating current coil for retracting said armature out of the path of said cam, a transmission line comprising a pair of conductors, said electromagnet for moving the actuator and said locking magnet coil being connected in parallel with one another across said pair of conductors, a condenser in series with the locking magnet coil, sources of alternating current and direct current, switching means for intermittently connecting said line to the direct current source to energize said electromagnet for moving the actuator to turn the toothed wheel, shaft and disc until blocked by the engagement of said cam with the armature of the locking magnet in a position one half pitch before said zero position and switching means for connecting said line to the said alternating current source to energize the locking magnet and thereby unlock said shaft, whereupon the wheel, shaft and disc are moved the last half pitch by action of said spring.

3. In an installation for the optical indication of multiple digit indicia, an indicator for one digit comprising a rotatable shaft, a disc carrying indicia and a toothed wheel fixed on said shaft, an oscillatable actuator carrying spaced fingers engageable with the teeth of said wheel, a direct current solenoid for moving the actuator in one direction to move the wheel one half pitch by engagement of one of the fingers with a tooth of the wheel, a spring for moving the actuator in the opposite direction to move the wheel a second half pitch by engagement of the other finger with a tooth of the wheel, a locking cam fixed on said shaft, a locking magnet comprising an armature normally in the path of said cam in a position to block said cam and thereby lock the shaft prior to the last half pitch before reaching a predetermined zero position and an alternating current coil for retracting said armature out of the path of said cam and a condenser in series with the coil, a second indicator of like construction for indicating a second digit and a control circuit for said indicators comprising three conductors, the solenoid for moving the actuator and the locking magnet of one indicator being connected in parallel with one another between a first and a second conductor, the solenoid for moving the actuator and the locking magnet of the second indicator being connected in parallel with one another between a second conductor and the third conductor, a direct current source, an alternating current source, said second conductor being connected to one side of each of said sources, switching means for individually and intermittently connecting the first and third conductors to the other side of the direct current source to energize the solenoids of said actuators to turn the toothed wheels, shafts and discs of the indicators until blocked by the engagement of said cams with the armatures of the locking magnets in a position one half pitch before the zero position and switching means for connecting the first and third conductors to the other side of the alternating current source to energize the locking magnets and thereby unlock said shafts.

OTTO TSCHUMI.

REFERENCES CITED

The following references are of record in the file of this patent:

UNITED STATES PATENTS

| Number | Name | Date |
|---|---|---|
| 1,055,929 | Long | Mar. 11, 1913 |
| 1,452,903 | Bakken | Apr. 24, 1923 |
| 1,171,915 | Abernethy | Feb. 15, 1916 |
| 1,672,005 | Sorenson | June 5, 1928 |
| 1,744,931 | Spray | Jan. 28, 1930 |
| 2,424,243 | Lowell | July 22, 1947 |